May 1, 1962 D. W. JONES 3,031,806
AUTOMATIC LAP PLATE CONTOUR CONTROL
Filed April 12, 1960 5 Sheets-Sheet 1

INVENTOR.
David W. Jones
BY Charles F. Vajtech
Attorney

INVENTOR.
David W. Jones

May 1, 1962 D. W. JONES 3,031,806
AUTOMATIC LAP PLATE CONTOUR CONTROL
Filed April 12, 1960 5 Sheets-Sheet 4

INVENTOR.
David W. Jones
BY Charles J. Vrtech
Attorney

United States Patent Office 3,031,806
Patented May 1, 1962

3,031,806
AUTOMATIC LAP PLATE CONTOUR CONTROL
David W. Jones, Cavecreek, Ariz., assignor to Crane Packing Company, Morton Grove, Ill., a corporation of Illinois
Filed Apr. 12, 1960, Ser. No. 21,791
21 Claims. (Cl. 51—129)

This invention relates to an apparatus for automatically maintaining a predetermined contour on the annular lap plate of a lapping machine. The invention is particularly well suited for use with lapping machines of the type described in R. G. Roshong Patent 2,627,144 dated February 3, 1953, and will be described with reference to its application to such a machine.

In the afore-mentioned Roshong patent there is disclosed an annular lap plate rotatable about a vertical axis with a plurality of conditioning devices mounted on the lap plate for maintaining the lap surface true to a predetermined contour. These conditioning devices are in the form of heavy rings which rest freely upon the lap surface and are of such diameter as to overlap one or both of the peripheries of the annular lap. The rings are driven through their frictional contact with the rotating lap and are held against revolution with the lap by individual yokes extending partially over the lap surface and provided with rollers against which the rings bear. The contour produced by the rings on the lap is determined by the radial position of the rings thereon, a concave condition being produced when the rings are shifted radially inwardly to overhang the inner periphery of the lap more than the outer periphery, a convex condition being produced when the rings are shifted radially outwardly to overhang the outer periphery of the lap more than its inner periphery and a flat contour being provided when the rings are intermediate these extreme positions. The principle upon which the rings operate to control the lap contour is described in U.S. Patent Re 23,937 issued to E. J. Bullard, the original Bullard patent having issued August 28, 1951, as Patent No. 2,565,590.

The type of work being lapped affects the lap contour so that the position of the rings on the lap may require a change in accordance with the type of work. This requires in the aforesaid Roshong patent that the machine be halted, the yokes moved appropriately in a radial direction to obtain the desired correction and then fixed in the shifted position whereupon the machine may resume its operation. Periodic checking of the articles being lapped reveals when the lap condition is such as to produce unsatisfactory work and makes necessary a change in the position of the rings. It is thus required that qualified personnel periodically check the condition of the parts as they leave the machine, and other qualified personnel is required to shift the position of the rings if the parts reveal an unsatisfactory operation of the machine.

It is among the more general objects of this invention to provide a lap surface sensing device which will compare a lap surface with a predetermined standard and will then produce a signal which is peculiar to one of the three principal conditions of a lap surface, viz., low, true or high, which signal may then be directed to a truing device for the lap to dictate the truing action to be produced by it on the lap surface.

Another object of this invention is to provide apparatus for use with a lapping machine of the type described in the aforesaid Roshong patent for sensing the lap condition and then automatically shifting at least one of said rings in a direction calculated to correct any deviation from the desired lap contour detected by the sensing means.

Another object of this invention is the provision of apparatus for use with the Roshong type of correcting-ring holding means wherein lap contour sensing means is automatically periodically applied to the surface of the lap, and automatically operable ring positioning means is then made to shift one or more of the rings of the machine to correct the lap surface in accordance with deviations from the desired contour detected by the sensing means.

Another general object of this invention is the provision of a lap contour correcting means for an annular lap of the type disclosed in the aforesaid Roshong Patent No. 2,627,144 which will effect a change in the correcting mechanism in accordance with the condition of the lap, wherein such changes are made without interrupting the operation of the machine.

A more specific object of this invention is the provision of a lap surface contour probing device which uses electro-mechanically operated probes of a rugged character and which possess the quality of repeatability to a high degree.

Another specific object of this invention is an electro-magnetically operated device for shifting the position of a ring-shaped truing device on a lap to change the effect of the truing device on the lap surface.

These and other objects of this invention will become apparent from the following detailed description of the invention when taken together with the accompanying drawings showing a preferred form thereof in which—

Figure 1:
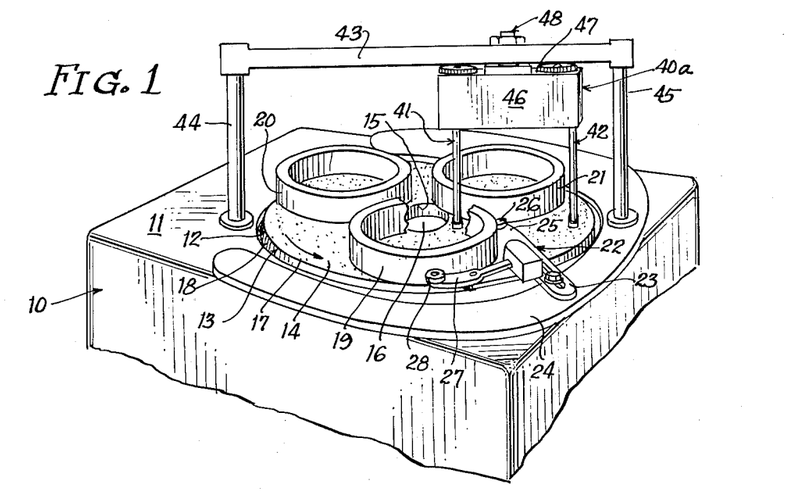
FIGURE 1 is a perspective plan view of the upper portion of a lapping machine upon which has been installed the lap sensing device and the truing ring position correcting device of this invention.

The type of lapping apparatus to which the present invention is most readily adapted is shown in FIG. 1. It is comprised of a frame 10 having a table-like top 11 in which is formed a circular opening 12 through which extends a circular lap plate 13. Suitable means (not shown) disposed within and supported by frame 10 rotates lap plate 13 at a constant speed in a counterclockwise direction as viewed in FIG. 1.

Lap plate 13 has a lap surface 14 which for purposes of illustration will be considered to be flat, although this invention can be used with equal facility on lap plates which are intended to be slightly convex or slightly concave. Said lap surface 14 is annular in form, the inner periphery 15 of which is formed by a central depression or well 16 and its outer periphery 17 is formed by the outer cylindrical surface 18 of the lap plate 13. It is contemplated that articles to be lapped will be held against surface 14, and that a lapping compound will be applied to said surface 14, either in paste or liquid form, to abrade and lap the article as lap plate 13 is rotated under it.

The holding means for the articles may comprise one or more relatively heavy rings 19, 20 and 21 of cast iron which rest on the lap freely and which are held against revolution therewith by yoke mechanisms of the type disclosed in the afore-mentioned Roshong patent. The articles to be lapped may be placed within the rings. The yoke mechanisms for the rings 20 and 21 illustrated in FIG. 1 are not shown for the sake of simplicity. Such mechanisms, however, permit the rings held thereby to rotate freely about their own axes under the influence of frictional forces developed between said rings and lap surface 14 as the latter is rotated under the rings. The outside diameter of the rings is preferably greater than the radial dimension of lap surface 14 so that the rings overhang either the inner periphery 15 or the outer periphery 17 or both of the lap surface 14. The overhang of the rings produces differential wear on the lap surface radially thereof and follows the lap surface truing principle described in the aforesaid Bullard patent. The rings thus may perform the dual function of holding work on the lap, the work being placed within the rings for this purpose, and the function of keeping the lap surface contour true to a predetermined contour. In the machine illustrated herein, the lap surface is intended to be perfectly flat and hence the rings 19, 20 and 21 are intended to wear the lap surface 14 in such manner that regardless of the nature of the work being lapped, the surface 14 will remain flat to within a predetermined degree of flatness per three inches of diameter of the work.

According to the Bullard principle, rings 19, 20 and 21 can be made to control the lap contour by causing varying degrees of wear across a radius of the lap surface. This varying wear, in turn, is produced by regulating the relative amount of overhang of the rings with reference to the inner and outer peripheries 15 and 17 of the lap surface 14. Thus, if lap surface 14 has become worn to a slightly concave contour instead of a desired flat contour, rings 19, 20 and 21 may be shifted radially outwardly to overhang the outer periphery 17 to a greater extent than they overhang the inner periphery 15, thereby producing a progressively greater wear on the lap surface from the inner periphery 15 to the outer periphery 17. Conversely, if lap surface 14 is worn to a convex contour instead of the flat contour desired, the rings 19, 20 and 21 may be shifted radially inwardly to overhang the inner periphery 15 to a greater extent than the outer periphery 17 and thus to produce progressively greater wear on the lap surface 14 from the outer periphery 17 to the inner periphery 15. Obviously, by selecting the proper location of the rings relative to the lap surface, the latter can be maintained flat for an indefinite length of time for a given type of work being lapped.

For convenience, and in keeping with nomenclature established in the art, rings 19, 20 and 21 will hereinafter be termed "wear" rings.

There are several factors which control the wear of the wear rings 19, 20 and 21 on lap surface 14. Thus, for example, if the rings, though free, for some reason or other are not permitted to rotate at their maximum speed, their effect upon the lap will be different, that is, they will tend to wear the lap more on the outside than on the inside and hence, although the position of the rings relative to the inner and outer peripheries may be a theoretically ideal position, they will nevertheless not produce the desired effect on the lap surface. It has also been found that the work being lapped has an effect on the lap contour and that this effect varies with each configuration and weight of work. The result, therefore, is that the work coming off the lap of the Roshong construction must be periodically checked to see whether it falls within the allowable tolerances for contour, and if it does not, then the rings must be shifted appropriately to compensate for the error produced and to bring the lap surface back to its desired contour.

It is contemplated that the lap sensing device and ring-holding mechanism of this invention as applied to the Roshong type of lapping machine will automatically and periodically sense the lap contour and, if the contour has deviated by a predetermined amount from the desired contour, will cause the ring-holding mechanism to move the ring in a radial direction either inwardly or outwardly as required to restore the lap surface to its desired contour. Only one ring-holding mechanism responsive to the sensing device is shown in the present illustrative embodiment, it being understood that more such mechanisms can be used if more rapid correcting action is desired.

The novel yoke mechanism is shown in FIG. 1 generally at 22 and is comprised of a slotted bar 23 secured to a guard plate 24 extending around the greater portion of lap plate 13 and secured to and forming part of frame 10. Said bar 23 has an arm 25 on the end of which is a roller 26 which is contacted by the cylindrical outer periphery of ring 19. A second arm 27 is secured to bar 23 and has a roller 28 mounted on the end thereof, said roller contacting the outer periphery of ring 19 so that said ring is retained between rollers 26 and 28. Thus, the rotation of lap 13 in a counterclockwise direction carries ring 19 against rollers 26 and 28 and holds said ring thereagainst while said ring is rotated about its own axis as a result of the frictional forces developed between itself and lap surface 14.

Figures 2, 3:
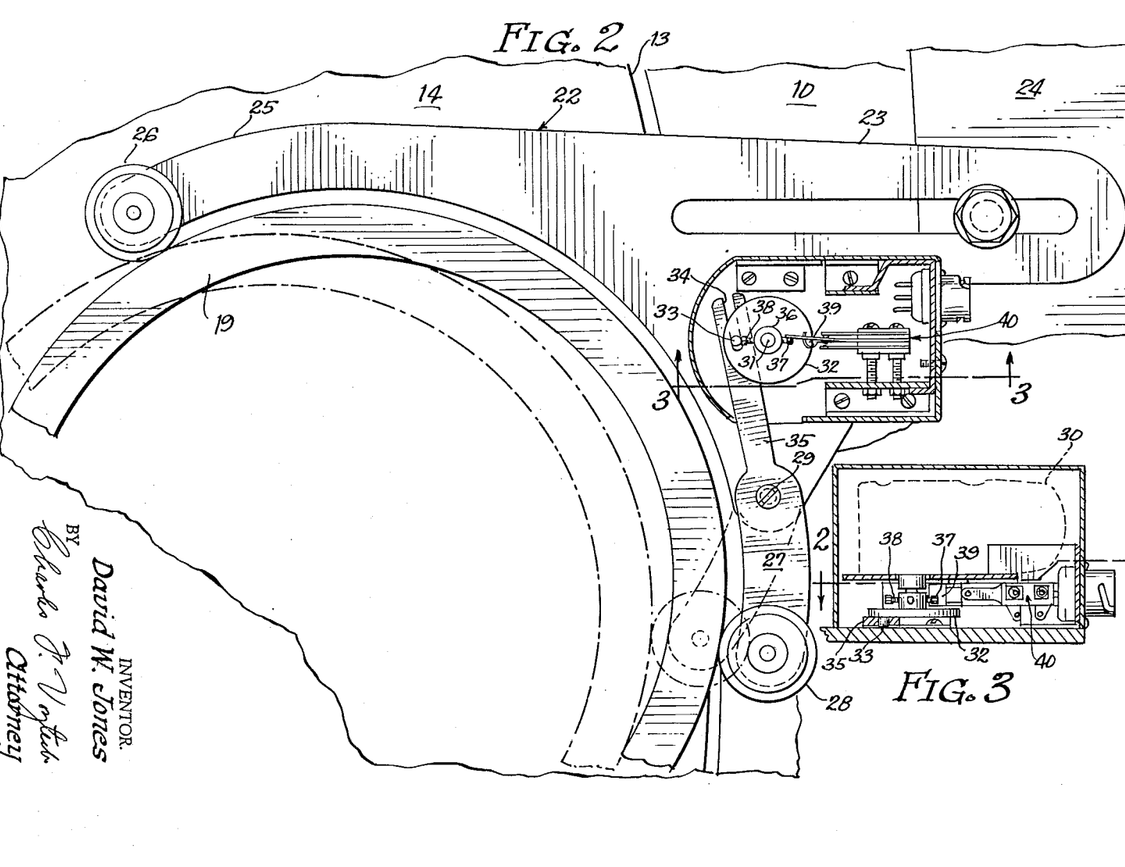
FIG. 2 is an enlarged plan view, partly in section, of the ring holding and shifting device of FIG. 1.
FIG. 3 is an elevation in section of a portion of the ring shifting device of FIG. 2 taken along line 3—3 thereof.

The novel yoke mechanism is shown in greater detail and on an enlarged scale in FIG. 2, to which reference is now made. Arm 27 as shown in FIG. 2 is not integral with slotted bar 23, but is a separate arm which is pivoted at 29 to bar 23 so that it can swing in a horizontal plane. Inasmuch as the axis of roller 26 is relatively fixed, the swinging of roller 28 in a horizontal plane will cause the ring 19 to be shifted radially of the lap surface 14 to change the degree of overhang of the ring at the inner and outer peripheries of the lap. It is contemplated that the shifting mechanism will be of the "on-off" type so that the ring will occupy one of two extreme positions. The mechanism for swinging arm 27, therefore, is of such character as to continue in operation once it is started until the desired limit on movement of the roller 28 is reached, whereupon it will automatically shut itself off. In the form chosen to illustrate this invention, the mechanism is comprised of a small motor shown only in outline in FIG. 3 at 30, said motor being combined with a speed reducer which has an output shaft 31 secured to a plate 32 so as to rotate the latter therewith. Said plate has on its lower face a pin 33 which extends downwardly into a slot 34 formed in the end 35 of arm 27 extending beyond pivot 29. Thus, as plate 32 is rotated, pin 33 will ride in slot 34 and will impart a lateral movement thereto which in turn will cause arm 27 to rock about its pivot 29 to effect the radial movement of roller 28 and the corresponding movement of ring 19.

Mounted above plate 32 and extending radially outwardly from the hub 36 of plate 32 are diametrically opposed stops 37, 38 which are designed to engage and move the operative lever 39 of a limit switch 40 which controls the operation of motor 30 as will hereinafter be described.

Whether the roller 28 should be moved radially and, if so, in what direction, is controlled by a lap surface contour sensing mechanism shown generally in FIG. 1 at 40a. This mechanism consists of a pair of radially spaced probes 41 and 42 which are periodically lowered to contact lap surface 14, with means operated by the probes for detecting variations in the vertical distance of selected points on the lap surface from a horizontal reference plane determined by a bar 43 rigidly supported on standards 44 and 45 affixed to table top 11 and guard plate 24. Said control mechanism includes a base plate 46, a horizontally disposed mounting flange 47 secured to base plate 46 and to a clamping device 48 by which the control mechanism 40a may be rigidly secured to bar 43. Suitable means (not shown) may be used to permit the dis-assembly of bar 43 from standards 44 and 45 to make possible the servicing of the lap plate 13 and its removal and replacement when worn.

Figure 4:
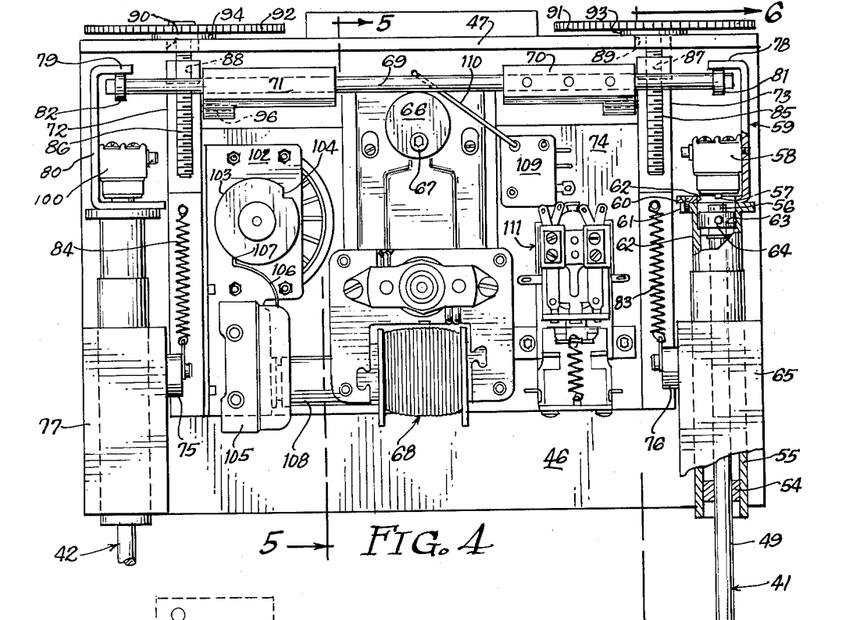
FIG. 4 is an elevational view, greatly enlarged, of the lap surface contour sensing device of FIG. 1.
Figure 5:
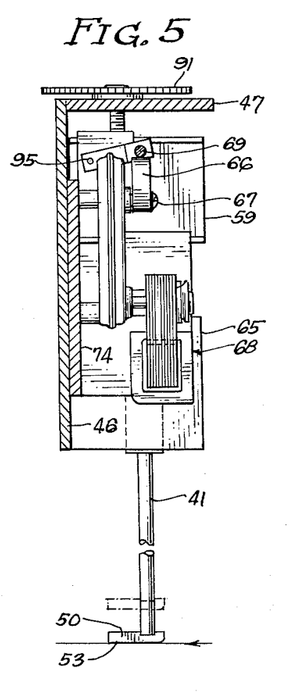
FIG. 5 is an end elevation in section of the sensing device of FIG. 4, the section being taken along line 5—5 of FIG. 4.
Figure 6:
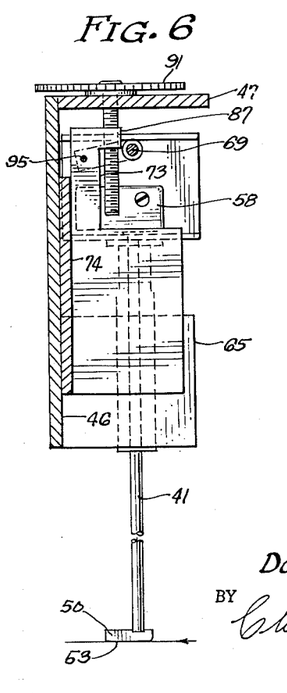
FIG. 6 is another end elevational view of the sensing device of FIG. 4, in section, the section being taken along line 6—6 of FIG. 4.

The details of construction of the control mechanism are shown in FIGS. 4, 5 and 6, reference to which is now made.

Probes 41 and 42 may be identical and may be comprised of a vertically disposed rod 49 to the bottom end of which is secured a foot 50 preferably made of a hard abrasion-resistant material such as tungsten carbide and having a forward end 51 which is shorter than the rearward end 52 so as to be self-aligning or castering when the lower surface 53 of which contacts the moving surface 14 of lap plate 13.

Rod 49 extends upwardly through a bearing 54 disposed in a tube 55 in such manner that its upper end 56 is in close proximity to the actuator 57 of a microswitch shown generally at 58. Said micro-switch 58 is secured to a U-shaped plate 59, one of the sides 60 of which is secured to a flange 61 formed in the upper end 62 of tube 55. Side 60 is apertured at 62 so that the upper end 56 of rod 49 may pass therethrough to contact actuator 57.

The interior of the upper end of tube 55 is counterbored at 63 to provide a shoulder against which a stop collar 64 secured to the upper end 56 of rod 49 may bear, thereby to limit downward movement of rod 49 relative to tube 55. The tube 55 is slidably held in a block 65 which is permanently secured by any suitable means to the base plate 46. Said block is made relatively heavy for purposes of rigidity.

It is contemplated that the probes 41, 42, including the feet 50 thereon, will normally be held approximately one-half inch above the lap surface 14 when the probes are not in use, to avoid any excess wear of, and possible damage to, the feet and probes. Tube 55, therefore, and the micro-switch 58 and U-shaped plate 59 are adapted to be raised and held in a raised position by the mechanism hereinafter to be described. It may be observed that the raising of tube 55 results in a corresponding elevation of rod 49 because of the contact between stop collar 64 and the bottom of counterbore 63, and that the raising of rod 49 may therefore be effected simply by raising tube 55 a sufficient amount.

A cam 66 rotates under, and supports, a transversely disposed rod 69 which passes through spaced, long bearings 70 and 71, each of which in turn is pivotally mounted on spaced substantially parallel plates 73 and 72, respectively. The long bearings determine the location of the axis of rod 69. Said plates 72 and 73 extend vertically and horizontally away from a secondary base plate 74 to which they are rigidly secured. Said secondary base plate 74 is disposed adjacent to base plate 46 and is free to slide thereon, or to turn to a limited extent thereover. A pair of guide rollers 76, 75 mounted on block 65 and its corresponding block 77 associated with probe 42 serve to retain secondary base plate 74 in slidable contact with base plate 46. Since secondary base plate 74 is free to turn relative to base plate 46, one bearing 71, for example, may be raised above the other bearing 70 for the purpose of establishing a reference line which is parallel to the ideal lap surface, and which may be used in conjunction with the probes 41, 42 to determine what correction, of any, is required in the lap contour, all as will be hereinafter described.

Rod 69 extends across secondary base plate 74 and under the upper side 78 of the U-shaped plate 59 and the corresponding upper side 79 of a U-shaped plate 80 for probe 42. The contact between the ends of the rod 69 and the bracket sides 78 and 79 is established by rollers 81 and 82 secured to said ends of rod 69. Tension springs 83, 84, secured to the shafts of guide rollers 76, 75 at one of their ends and to horizontally extending plates 72, 73 at their other ends, serve to exert a downward force on said plates and on the associated secondary base plate 74. This downward force and its resultant downward movement of base plate 74 is limited by adjusting screws 85, 86 which pass through threaded openings 87, 88 in the upper regions of the plates 73, 72 and through corresponding apertures 89 and 90 in the mounting flange 47 extending horizontally from base plate 46. Adjusting screws 85 and 86 are turned by means of large dials 91 and 92, respectively, which are secured to the ends of the screws extending above mounting flange 47, said dials having hubs 93 and 94 which rest on flange 47 and from which secondary base plate 74 is in fact suspended.

Bearings 70 and 71, which support rod 69, are pivoted on the plates 73 and 72, respectively, as aforesaid, the pivot for bearing 70 being shown at 95 in FIG. 5 and the axis for the pivot for bearing 71 being shown in FIG. 4 at 96. It is intended that rod 69 be oscillated vertically about said pivots relative to secondary base plate 74, but that the axes of the said pivots, and the axis of rod 69 remain at all times parallel or true to the desired ideal or true surface on lap plate 13. It is the comparison of the disposition of the rod axis with the plane of the lap surface 14 which is relied upon to sense or detect departures of the lap surface from the desired true surface. The angular position of the rod axis must therefore be capable of adjustment relative to the lap surface, and such adjustment is accomplished by selectively turning one or the other of the screws 85 and 86 until the rod assumes the desired position. Inasmuch as there are several devices interposed between the lap surface and the rod at each end of the rod, each of which devices may vary slightly in size or location from a mathematically determined size or location, it is preferred to determine the true position of the rod empirically, rather than by strict adherence to a calculated dial setting. This can be done by mounting the sensing device 40a on a machine the lap surface of which is known to be true, and then adjusting the angularity of the sensing device with reference to a horizontal plane by means of the dials 91, 92 until the sensing device indicates that no correction is required. Alternatively, the sensing device 40a may be "zeroed" with reference to a test surface, either on a separate lap or plate or on a straight edge laid across the lap, at least four readings 90° apart being taken to average out the effect of "wobble" in the rotation of the lap.

Figure 8:
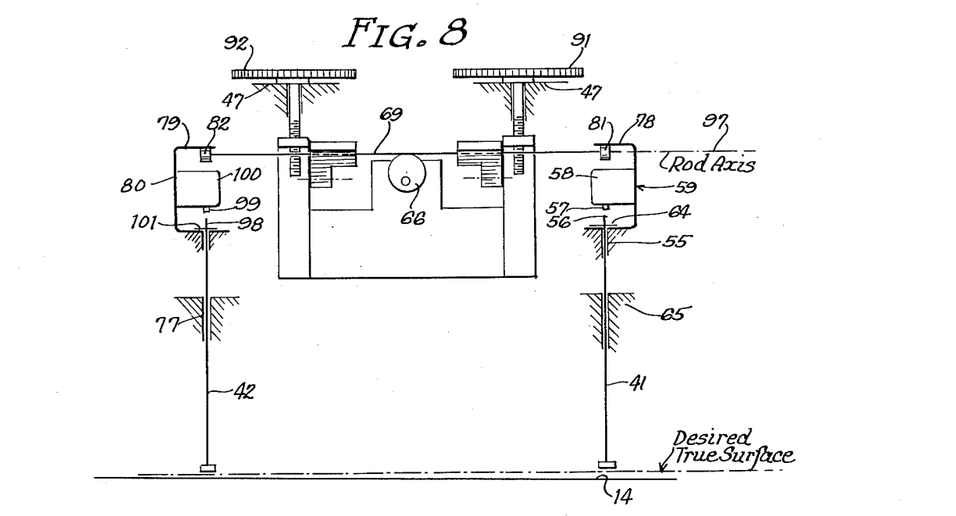
FIGS. 8–10 are schematic line drawings of the sensing device of FIG. 4 showing it in three different stages of its operation.
Figure 9:
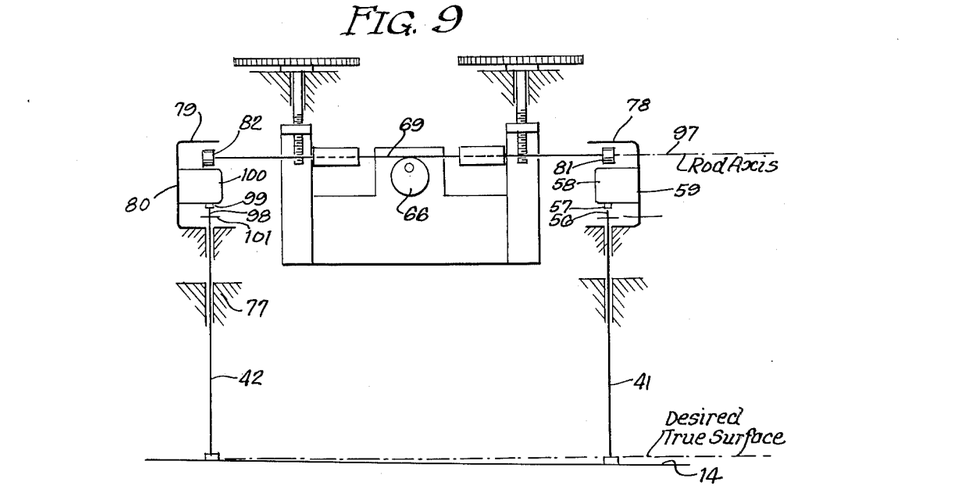
Figure 10:
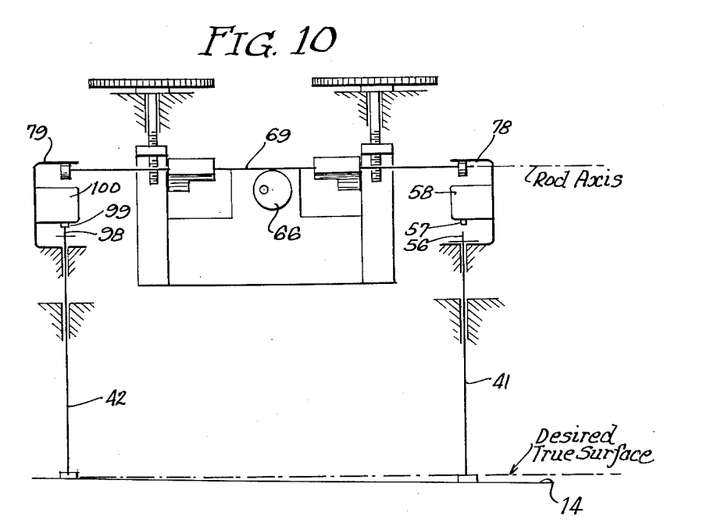

The manner in which the sensing device is operated after the angular position of rod 69 for a true surface has been determined, is illustrated in FIGS. 8, 9 and 10 wherein FIG. 8 shows the arrangement of the components of the sensing device when both probes 41, 42 are raised off the lap surface 14, FIG. 9 the arrangement when both probes are on the lap surface, and FIG. 10 the arrangement when one probe has released its micro-switch, which is the critical factor in determining whether motor 30 shall be operated and if so, in which direction.

Referring now to FIG. 8, rod 69 is shown in its highest position on cam 66, its axis 97 having been adjusted by manipulation of dials 91 and 92 until it is parallel to the plane of the desired true surface on lap 13. For purposes of illustration it will be assumed that the probes 41 and 42 and their associated devices connecting them to rod 69 are identical, that the desired true surface is a flat surface, and that the axis 97 of rod 69 is parallel with the desired true surface. It will be noted that the upper end 56 of probe 41 is out of contact with actuator 57 of micro-switch 58 and that the upper end 98 of probe 42 is likewise out of contact with actuator 99 of its associated micro-switch 100. Both probes and their associated assemblies are suspended from rollers 81 and 82 through the upper sides 78, 79 of brackets 59 and 80, and ultimately through the stop collar 64 and the corresponding stop collar 101 on probe 42. The actual lap surface 14 is shown as a solid line and is seen to be inclined to the desired true surface and hence is out of "true" and requires correction. If the center of the lap is assumed to be to the right of probe 41, then the lap surface 14 is concave, and if it is to the left of probe 42, lap surface 14 is convex.

In FIG. 9, cam 66 has been rotated through 180° and rod 69 is at its lowermost position. During its descent, both probes 41 and 42 have contacted lap surface 14 and brackets 59 and 80 have descended first with, and then beyond, the probes until the upper ends 56 and 98 thereof have moved toward, contacted and then pushed inward to operative position, the actuators 57 and 99 of micro-switches 58 and 100. Rod 69 under this condition has descended beyond and is completely out of contact with, the upper ends 78 and 79 of brackets 59 and 80. Under these conditions, as will be hereinafter more fully described, motor 30 controlling the position of arm 27 and ring 19 will not operate and hence no change in lap surface contour will be effected. It may be noted that since lap surface 14 slopes downwardly from the desired true surface from probe 42 to probe 41, the latter probe has descended more than the former. This means that upon a reversal of the direction of rod 69 to raise the probes, bracket 59 will be contacted by roller 81 of rod 69 before bracket 80 will be contacted by roller 82 and hence a separation of actuator 56 and probe end 56 will take place before actuator 99 is released by rod end 98. It is this differential action which is utilized in the control mechanism hereinafter to be described to initiate operation of motor 30 and to discriminate as to the direction in which it will rotate.

The differential action of the lifting mechanism is illustrated in FIG. 10. Cam 66 is shown in that position wherein actuator 57 of micro-switch 58 is free of end 56 of probe 41 and the micro-switch associated therewith has been de-activated. Actuator 99 is still held by upper end 98 of probe 42 in its switch-operating position. Continued rotation of cam 66 restores the sensing mechanism to the condition shown in FIG. 8.

Although the raising and lowering of the probes may be initiated at will, it is contemplated in the form of the invention selected to illustrate its operation, that the lap surface 14 will be checked periodically and this whether or not the lap is rotating at the instant its surface is being checked. To this end, an electromagnetic timing device of known construction is used which may take the form of a constantly running motor 102 (FIG. 4) mounted on secondary base plate 74, which drives a timing cam 103 having a notch 104 in the periphery thereof. A switch 105 connected to energize motor 68 for cam 66, is mounted adjacent motor 102 and has a contact arm 106, the end 107 of which rides the periphery of timing cam 103 so that switch 105 is closed when end 107 falls into notch 104. Timing motor 102 is designed to produce one revolution of cam 103 every ten minutes, but other time intervals may be utilized if desired. Cam motor 68 is energized through a time delay relay 108 working in conjunction with a limit switch 109, the arm 110 of which rides on rod 69. Delay relay 108 is normally on and is disconnected after a short delay. Limit switch 109 is normally open and is closed when rod 69 begins its downward movement. Thus, delay relay 108 is operative only long enough to allow limit switch 109 to be closed, after which it is de-energized to allow the limit switch to control the operation of motor 68.

It may be noted from FIG. 9 that there is a short period during which rod 69 is out of contact with both probes while the latter are on the lap surface 14. This provides approximately three seconds of dwell during which the foot 50 of each probe may ride the lap surface and clear out any grit or particles upon which the foot may have initially descended.

The control for motor 30, by which a radial shift of arm 27 and ring 19 is made, is through a latching relay 111 which may also be mounted on secondary base plate 74 (FIG. 4). Said latching relay is in effect two relays, one energized by each probe-operated micro-switch 58 and 100, and each controlling operation of reversible motor 30 in an opposite direction.

Figure 7:
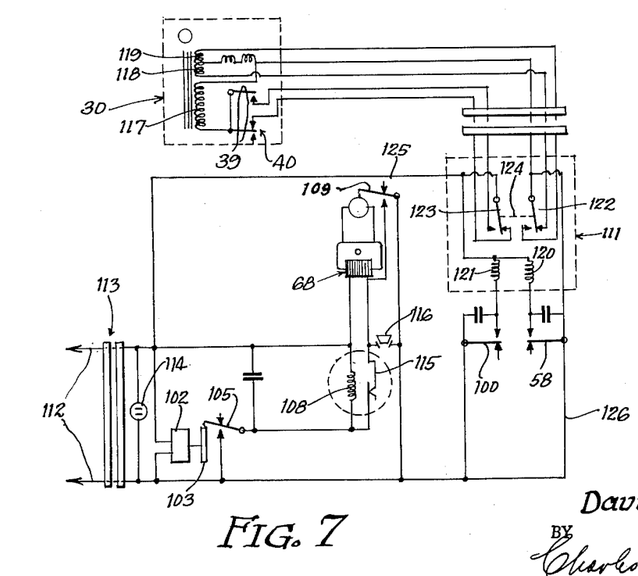
FIG. 7 is a schematic wiring diagram for the lap surface sensing device and the ring shifting device controlled thereby.

The complete circuit for the electrical components of the sensing device and ring 19 moving device is shown in FIG. 7, to which reference is now made. The circuit is energized from a suitable 110 volt line 112 through the usual plug and socket connection 113. A lamp 114 may be used to show that the circuit is energized. Timing motor 102 is shown connected across line 112, and its cam 103 is shown schematically operating switch 105, which is normally open. When closed, switch 105 energizes delay relay 108, the resultant closed switch 115 thereof completing the circuit through and energizing cam motor 68. Limit switch 109 is shown normally open and is closed upon initial downward movement of rod 69 (FIG. 4). A manually operated switch 116 may be used to lower the probes independently of timing motor 102 and limit switch 109 and to allow the sensing device to go through one or more operating cycles, as desired.

The reversible motor 30 is shown in the upper left portion of FIG. 7 and the armature winding thereof is shown at 117. The field is divided, one portion 118 being wound to provide rotation of the armature in one direction, and the other portion 119 being wound to provide rotation of the armature in the opposite direction. Limit switch 40 is shown in series with armature 117.

Latching relay 111 has two separate windings 120, 121 connected across line 112 through micro-switches 58 and 100. Winding 120 controls single pole double throw switch 122 and winding 121 controls single pole double throw switch 123. Said switches 122, 123 are mechanically interlocked by a latch shown diagrammatically at 124, in any well known manner, the switches in effect providing a double pole double throw switch. The purpose of the latching mechanism of latching relay 111 is to maintain the double pole double throw switch in either of the two "throw" positions, depending upon which winding, 120, 121 is de-energized last, the sequence of de-energizing being determined by the order of opening of micro-switches 58 and 100.

As shown in FIG. 7, switch 123 of latching relay 111 operates in conjunction with limit switch 40 to connect lead 125 of line 112 to one side or the other of limit switch 40, and switch 122 serves to transfer lead 126 of line 112 from one winding to the other of the motor reversing windings 118, 119. Thus, for example, should limit switch 40 come to rest with its upper contact made as viewed in FIG. 7 and switches 122 and 123 of relay 111 latched to the right as viewed in FIG. 7, lead 125 will be connected to the open lower contact of switch 40 and hence motor 30 will not operate. In the event that sensing mechanism 46 were operated and micro-switch 58 were the first to open upon raising of the probes from the lap surface, switches 122 and 123 would both remain as shown in FIG. 7 and motor 30 would not operate, indicating that the ring 19 was correctly located for the existing lap surface condition. On the other hand, should micro-switch 100 be the last to open, then switch 123 would move to the left as viewed in FIG. 7, thus connecting the upper contact of switch 40 to lead 125, and since this contact is made, winding 117 would be energized. Simultaneously switch 122 would also be transferred to the left as viewed in FIG. 7, transferring lead 126 to winding 119 to energize that winding and cause the motor to rotate in the direction dictated by that winding. Ring 19 would therefore be shifted to its extreme position away from its present position, indicating that a correction of the lap surface contour in the opposite sense is necessary. Motor 30 would then continue rotating until limit switch 40 were changed to its opposite position by limit stop 37 or 38, thus setting up the circuit for operation of the motor 30 in the opposite direction should the order of opening of micro-switches 58 and 100 change during subsequent probes of the lap surface.

The foregoing device provides an automatic means for periodically sensing a lap surface contour, comparing it with a reference line, and causing an adjustable conditioning device mounted on the lap surface to be adjusted, if necessary, to correct an improper operation thereof, whereby to maintain at all times the desired contour on the lap surface. The dials 91, 92 provide a means for changing the reference line and therefore for changing the lap contour, if desired. Thus, if instead of a flat lap surface, a slightly convex surface should be desired to produce slightly concave surfaces on the articles being lapped, it is only necessary to raise the inner bearing 70 relative to the outer bearing 71 an appropriate amount, and the device will automatically shift the ring 19 to its outside position and hold it there until the desired contour is produced.

Although the automatic ring shifting device of FIG. 2 has been shown as applied to but one ring, it is understood that the remaining rings 20 and 21 may likewise be supplied with such automatic shifting device for a more rapid correcting action.

It is understood that the sensing device 40a may be connected to control the operation of other forms of lap surface contour changing mechanisms than the rings 19, 20 and 21, and that the ring shifting mechanism shown in FIG. 2 may be used with other lap surface contour sensing mechanisms, or in fact, may be operated manually as a more facile means for shifting correcting rings than that disclosed in the aforementioned Roshong patent. The scope of this invention, therefore, should not be limited to the foregoing illustrative embodiment, but should be determined by the appended claims.

I claim:

1. In combination, a rotatable machine element having a surface adapted to finish the exterior of articles, said surface being of predetermined contour, and means for automatically maintaining said predetermined contour on said surface despite wear thereof by said articles, said means comprising a correcting device adapted to bear against said surface and having a wearing effect thereupon, means for changing the wearing effect of said correcting device upon said surface at radially different points on said surface whereby to change the contour of said surface, means adapted to cooperate with said surface to sense deviations thereof from the predetermined contour, and means controlled by said sensing means for altering the wearing effect of said correcting device upon said surface to restore said surface to said predetermined contour.

2. In combination, a rotatable machine element having a surface adapted to finish the exterior of articles, said surface being of predetermined contour, and means for automatically maintaining said predetermined contour on said surface despite wear thereof by said articles, said means comprising a surface correcting device resting on said surface and adapted to wear said surface differently at different radial positions thereon, means for holding said correcting device at a predetermined location on the surface, means cooperable with the said surface for sensing deviations from the predetermined contour on the surface, and means controlled by the sensing means for shifting the correcting device to a radial location on the surface which will change the wear produced by the correcting device to restore the surface to said predetermined contour.

3. The combination described in claim 2, said rotatable machine element comprising a lap plate and the surface thereon being annular in form, said correcting device comprising a ring the outside diameter of which is greater than the radial dimension of the lap surface such that it overhangs at least one periphery of the lap, and the means controlled by the sensing means for shifting the correcting device comprising a holder having spaced rollers between which the ring is received, and means for changing the radial location of at least one of said rollers.

4. The combination described in claim 2, said rotatable machine element comprising a lap plate and the surface thereon being annular in form, said correcting device comprising a ring the outside diameter of which is greater than the radial dimension of the lap surface such that it overhangs at least one periphery of the lap, and the means controlled by the sensing means for shifting the correcting device comprising a holder having a portion thereof fixed relative to the center of the lap surface, a pivoted arm rotatable about an axis substantially parallel with the lap axis, a roller mounted on the holder, a roller radially spaced from the first said roller and mounted on the pivoted arm, and means for rotating said pivoted arm about its pivot, whereby to change the radial location of the roller mounted thereon.

5. The combination described in claim 4, and means for limiting the rotation of said pivoted arm, whereby to limit the amount of overhang of the ring with respect to the lap surface.

6. The combination described in claim 4, the means for rotating said pivoted arm comprising an electric motor, means connecting the motor to the arm to rotate the latter about its pivot, a source of electrical energy for the motor, switch means controlling the application of electrical energy to the motor, and means operated in timed relation with the movement of the pivoted arm for opening said switch when the arm has reached a predetermined position.

7. The combination described in claim 4, the means for rotating said pivoted arm comprising electric motor means having means for reversing the drive thereof, and means operated by said sensing means for determining the direction of rotation of the motor means.

8. In combination, a rotatable machine element having a surface adapted to finish the exterior of articles, said surface being of predetermined contour, and means for automatically maintaining said predetermined contour on said surface despite wear thereof by said articles, said means comprising a correcting device adapted to bear against said surface and having a wearing effect thereupon, means for changing the wearing effect of said correcting device upon said surface at radially different zones on said surface, means adapted to cooperate with said surface to sense deviations thereof from the predetermined contour, said sensing means comprising a frame for supporting said machine element, a rigid member mounted on said frame, a pair of probes radially spaced from one another with respect to the surface of the machine element and adapted to contact said surface, means for moving said member toward and away from said surface, means on the member for contacting said probes to move said probes toward and away from said surface, said last-mentioned means transferring the support of said probes from said member to said surface and back again upon contact of a probe with, and its removal from, said surface, means for adjusting the position of the member on the frame to produce a sequence of transfer of one probe relative to the other corresponding to that produced by said surface when it has said predetermined contour, means operated upon the transfer of the probes to produce an electric signal which is different for different sequences of transfer, and means controlled by said signal and adapted to alter the wearing effect of said correcting device upon said surface to restore said predetermined contour when the sequence of transfer is different from that produced by said surface when it has said predetermined contour.

9. The combination described in claim 8, said frame including a bar extending over the machine element, said member comprising a rod, and said means for moving the member toward and away from said surface comprising a base, and spaced pivoted supports on the base for the rod.

10. The combination described in claim 8, said frame including a bar extending over the machine element, said member comprising a rod, said means for moving the member toward and away from said surface comprising a base, and spaced pivoted supports on the base for the rod, and said means for adjusting the position of the member on the frame comprising threaded means supported on the frame and suspending the base therefrom, said threaded means being adapted to tilt the base relative to the surface.

11. The combination described in claim 8, said frame including a bar extending over the machine element, said member comprising a rod, said means for moving the member toward and away from said surface comprising a base, spaced pivoted supports on the base for the rod, rotatable cam means cooperable with the rod to oscillate said rod and its spaced supports about the pivots for said supports, and motor means for rotating said cam.

12. The combination described in claim 8, said frame including a bar extending over the machine element, said member comprising a rod, said means for moving the member toward and away from said surface comprising a base, spaced pivoted supports on the base for the rod, rotatable cam means cooperable with the rod to oscillate said rod and its spaced supports about the pivots for said supports, motor means for rotating said cam, motor driven timer means for automatically initiating the operation of the cam rotating motor, and means operated in timed relation with the movement of the rod for stopping the operation of said cam rotating motor.

13. The combination described in claim 8, said probes comprising a hollow member, means on the frame for supporting the hollow member for sliding movement relative thereto toward and away from the machine element surface, a probe rod mounted within the hollow member for sliding movement relative thereto, stop means limiting sliding movement of the probe rod in the hollow member in one direction, said means on the rigid member for contacting said probe cooperating with the hollow member, and said means to produce an electric signal including relatively movable elements, one of which is mounted for movement with the hollow member and the other of which extends into the path of movement of the probe rod when said probe rod slides relative to the hollow member.

14. In combination, a rotatable lap plate having an annular lapping surface thereon adapted to conform to a predetermined contour, sensing means for sensing deviations in the lapping surface from said predetermined contour, lap surface contour changing means cooperating with said lap surface, and means controlled by said sensing means for operating said lap surface contour changing means when said lap surface contour is different from the predetermined contour to produce the said predetermined contour thereon.

15. The combination described in claim 14, said sensing means including a frame fixedly mounted over said lapping surface, a base secured to the frame, spaced probe rods disposed adjacent the inner and outer peripheral regions of the lapping surface and having lower ends adapted to contact the said regions, hollow members each surrounding and supporting a probe rod for sliding movement therein, a slidable support on the base for the hollow members, means for raising and lowering the hollow members and their probe rods relative to the lapping surface, switch means carried by each hollow member and having a switch operator disposed in the path of movement of the probe rod and adapted to be operated thereby upon sliding movement of the probe rods in their hollow members, a pair of relay means, each adapted to be energized by a switch means operated by a probe rod, said means for operating said lap surface contour changing means including a reversible motor having a connection thereto controlling rotation thereof in one sense and a second connection thereto controlling rotation thereof in the opposite sense, a source of electrical energy for said reversible motor, and switch means operated by said relay means for applying said source of electrical energy to the connections to the reversible motor.

16. The combination described in claim 15, and means for limiting the rotation of said motor in either sense, comprising additional switch means for over-ruling said relay operated switch means, and means operated by said motor for operating said additional switch means to render said motor inoperative when it has reached the limit of its rotation in one sense and the relay operated switch means is conditioned for connecting said motor to said source of electrical energy to rotate in the same said sense.

17. The combination described in claim 15, and manually operable means for initiating the operation of the means for raising and lowering the hollow members.

18. A lapping machine comprising a frame, a rotatable annular lap supported by said frame, a lap surface contour changing device disposed on the lap and comprising a ring resting on the lap and proportioned to overhang at least one of the inner or outer peripheries of the lap, means for holding the ring on the lap against revolution therewith but permitting rotation of the ring about its own axis, and motor means mounted on the frame and connected to the ring holding means to shift the said holding means radially of the lap, whereby to alter the contour changing characteristics of the said device.

19. A lapping machine comprising a frame, a rotatable lap supported by said frame and having an annular lap surface thereon, a lap surface contour changing device disposed on the lap and comprising a ring resting on the lap surface and proportioned to overhang at least one of the inner or outer peripheries of said surface, an arm pivotally mounted on the frame and connected to the frame to locate said ring on said lap surface against revolution therewith, but permitting rotation of the ring about its own axis, and motor means mounted on the frame and connected to the arm to turn said arm on its pivot, thereby to alter the location of the ring on the lap surface and its overhang of the said peripheries of said surface.

20. In combination, a rotatable lap having an annular lap surface and a lap surface contour sensing device comprising a rigid support disposed adjacent the lap, hollow members slidably mounted on said support, probe rods slidably mounted in said hollow members and slidable into and away from contact with said lap surface, switch means carried by said hollow members and operable by said probe rods, common means for sliding the hollow members on said support, means for adjusting the position of the said common means relative to the lap surface whereby to adjust the sequence of operation of the switch means in relation to a predetermined contour on the lap surface such that upon removal of the probes from contact with the lap surface, the switches will be simultaneously opened if the surface is true to said predetermined contour, but one of said switches will be opened before the other if the lap surface is not true to said predetermined contour, and means for discriminating between different sequences of opening of the said switches.

21. In combination, a rotatable machine element having a surface adapted to finish a surface of an article, a surface shaping device bearing against said element surface to shape said element surface, means operable upon said shaping device for changing its shaping effect upon said element surface, and means controlling said effect-changing means, said controlling means comprising shiftable means having a zero position corresponding to a desired contour on said element surface wherein said controlling means produces no change in the shaping effect of said device upon said element, sensing means cooperable with said element surface and adapted to shift said shiftable means when said element surface differs from said desired contour, whereby to change the shaping effect of the shaping means upon said element surface to produce said desired surface.

References Cited in the file of this patent

UNITED STATES PATENTS

| | | | |
|---|---|---|---|
| 944,902 | Nichols | | Dec. 28, 1909 |
| 944,903 | Nichols | | Dec. 28, 1909 |
| 2,782,571 | Hanson | | Feb. 26, 1957 |
| 2,851,827 | Hill | | Sept. 16, 1958 |
| 2,883,802 | Katzke | | Apr. 28, 1959 |
| 2,883,803 | Stead | | Apr. 28, 1959 |
| 2,895,261 | Day | | July 21, 1959 |
| 2,946,162 | Mader | | July 26, 1960 |